United States Patent
Akasawa (10) Patent No.: US 7,777,785 B2
(45) Date of Patent: Aug. 17, 2010

(54) IMAGE PICKUP DEVICE, PICKED-UP IMAGE PROCESSING METHOD, AND COMPUTER-READABLE RECORDING MEDIUM FOR PERFORMING A CORRECTION PROCESS ON A PICKED-UP IMAGE

(75) Inventor: Mitsuyuki Akasawa, Hachioji (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 365 days.

(21) Appl. No.: 11/635,149

(22) Filed: Dec. 6, 2006

(65) Prior Publication Data
US 2007/0132862 A1    Jun. 14, 2007

(30) Foreign Application Priority Data
Dec. 9, 2005    (JP) .............................. 2005-356394

(51) Int. Cl.
H04N 5/225    (2006.01)
(52) U.S. Cl. ..................................... 348/222.1; 348/239
(58) Field of Classification Search ................. 382/275; 348/239, 222.1
See application file for complete search history.

(56) References Cited

U.S. PATENT DOCUMENTS

| | | | |
|---|---|---|---|
| 6,963,365 B2 | 11/2005 | Baron | |
| 7,129,974 B2 * | 10/2006 | Morichika | ............. 348/231.99 |
| 7,489,832 B2 * | 2/2009 | Makino et al. | ............. 382/287 |
| 2002/0041717 A1 * | 4/2002 | Murata et al. | ............. 382/275 |
| 2002/0118292 A1 * | 8/2002 | Baron | ......................... 348/335 |
| 2004/0197022 A1 * | 10/2004 | Gonsalves | ................... 348/235 |
| 2005/0078192 A1 | 4/2005 | Sakurai et al. | |
| 2005/0206734 A1 * | 9/2005 | Kubo et al. | .............. 348/207.1 |
| 2006/0038897 A1 * | 2/2006 | Sakimura et al. | ......... 348/231.6 |
| 2007/0065039 A1 * | 3/2007 | Park et al. | .................... 382/275 |

FOREIGN PATENT DOCUMENTS

| | | |
|---|---|---|
| JP | 2002 335438 | 11/2002 |
| JP | 2003 283964 | 10/2003 |
| JP | 2004 312732 | 11/2004 |
| JP | 2005-143092 | 6/2005 |
| WO | WO 99/67943 | 12/1999 |

OTHER PUBLICATIONS

Office Action dated Jan. 4, 2008 (with English translation) issued for the corresponding Chinese Patent Application.

* cited by examiner

*Primary Examiner*—Jason Whipkey
(74) *Attorney, Agent, or Firm*—Cohen Pontani Lieberman & Pavane LLP (57) ABSTRACT

An operability in performing an image correction process on a picked-up image of an object shot at approximately the same shooting angle is improved and a process time is shortened. A CPU in a cellular phone extracts the contour of the object from one of a plurality of picked-up images sequentially picked up in a sequential image pickup mode, and calculates correction data to be used in image correction based on the extracted contour. Thereafter, the CPU performs an image correction process on the plurality of picked-up images picked up sequentially to correct the distortion of the image of the object included in each picked-up image, using the calculated correction data.

12 Claims, 6 Drawing Sheets

| OPERATION MODE | | ON/OFF | REMARKS |
|---|---|---|---|
| SHOOTING MODE | CAMERA MODE | OFF | ... |
| | SEQUENTIAL IMAGE PICKUP MODE | ON | 9 |
| | CONFERENCE MODE | OFF | ... |
| | ⋮ | | |
| IMAGE CORRECTION PROCESS | | ON | ... |
| ⋮ | | ⋮ | |

IMAGE PICKUP DEVICE, PICKED-UP IMAGE PROCESSING METHOD, AND COMPUTER-READABLE RECORDING MEDIUM FOR PERFORMING A CORRECTION PROCESS ON A PICKED-UP IMAGE

BACKGROUND OF THE INVENTION

1. Field of the Invention

The present invention relates to an image pickup device and a picked-up image processing method that perform a correction process on a picked-up image, and a computer-readable recording medium.

2. Description of the Related Art

When shooting is performed in a conference or the like with a whiteboard or an image from a projector being an object, the image of a rectangular object may be distorted to a trapezoidal shape. In consideration of such a circumstance, there is an image pickup device that has an image correction process function of extracting the contour of a quadrangular region from a picked-up image, and correcting the shape of that region to a rectangle, thereby correcting the distortion of the image of the object, as disclosed in, for example, Unexamined Japanese Patent Application KOKAI Publication No. 2005-143092.

When the same object is sequentially shot plural times within a very short period of time, like sequential shooting, an shooting angle with respect to the object in the individual shootings becomes approximately the same. When a whiteboard or an image from the projector is shot at the same seat in a conference or the like, the shooting is performed at approximately the same shooting angle. When the image correction process is performed on images of the same object picked up at the same shooting angle, however, operations for executing a process of extracting the contour of a quadrangular region and the image correction process are performed for each image conventionally, so that this raises a problem such that the operations and the processes take a time.

SUMMARY OF THE INVENTION

An object of the invention is to improve an operability in performing an image correction process on a picked-up image of an object shot at approximately the same shooting angle, and shorten a process time.

To achieve the object, an image pickup device according to the first aspect of the invention comprises:

an image pickup unit that converts an optical image including an object into an electrical signal to acquire a picked-up image;

a mode selection unit that selects a particular image pickup mode in which an image pickup is performed a plurality of times in one circumstance by the image pickup unit;

a temporary memory unit that temporarily stores a plurality of picked-up images shot in the particular image pickup mode when a plurality of images are picked up by an arbitrary image pickup instruction operation in a condition in which the particular image pickup mode is selected by the mode selection unit;

a correction unit that performs a first process of, after finishing the shooting of the plurality of images in the particular image pickup mode, for any one of the picked-up images designated from the plurality of picked-up images temporarily stored in the temporary memory unit, performing image extraction of the designated one of the picked-up images to execute an image correction process on the image content of the designated one of the picked-up images and a second process of retaining correction data of the picked-up image corrected in the first process, and correcting, in the same image correction process performed on the designated one of the picked-up images, another picked-up image of an area specified by the particular image pickup mode temporarily stored in the temporary memory unit, based on the retained correction data; and an image storage unit that stores each of the picked-up images corrected in the first process and the second process as picked-up images corrected at the time of shooting.

A picked-up image processing method according to the second aspect of the invention comprises:

an image pickup step of picking up an object;

a mode selection step of selecting a particular image pickup mode in which an image pickup is performed a plurality of times in one circumstance in the image pickup step;

a temporary memory step of temporarily storing a plurality of picked-up images shot in the particular image pickup mode on a recording medium when a plurality of images are picked up by an arbitrary image pickup instruction operation in a condition in which the particular image pickup mode is selected in the mode selection step;

a first correction step of performing, after finishing the shooting of the plurality of images in the particular image pickup mode, for any one of the picked-up images designated from the plurality of picked-up images temporarily stored in the temporary memory step, image extraction of the designated one of the picked-up images to execute an image correction process on the image content of the designated one of the picked-up images;

a second correction step of retaining correction data of the picked-up image corrected by the first correction step, and correcting, in the same image correction process performed on the designated one of the picked-up images, another picked-up image of an area specified by the particular image pickup mode temporarily stored in the temporary memory unit, based on the retained correction data; and an image storage step of storing each of the picked-up images corrected by the first correction step and the second correction step as picked-up images corrected at the time of shooting.

A computer-readable recording medium according to the third aspect of the invention storing a program that allows a computer for controlling an image pickup device having an image pickup unit which converts an optical image including an object into an electrical signal to acquire a picked-up image to realize:

a mode selection function of selecting a particular image pickup mode in which an image pickup is performed a plurality of times in one circumstance by the image pickup unit;

a temporary memory function of temporarily storing a plurality of picked-up images shot in the particular image pickup mode on a recording medium when a plurality of images are picked up by an arbitrary image pickup instruction operation in a condition in which the particular image pickup mode is selected in the mode selection function;

a first correction function of performing, after finishing the shooting of the plurality of images in the particular image pickup mode, for any one of the picked-up images designated from the plurality of picked-up images temporarily stored in the temporary memory function, image extraction of the designated one of the picked-up images to execute an image correction process on the image content of the designated one of the picked-up images;

a second correction function of retaining correction data of the picked-up image corrected by the first correction function, and correcting, in the same image correction process performed on the designated one of the picked-up images, another picked-up image of an area specified by the particular image pickup mode temporarily stored by the temporary memory function, based on the retained correction data; and an image storage function of storing each of the picked-up images corrected by the first correction function and the second correction function as picked-up images corrected at the time of shooting.

According to the invention, example embodiments lead to an improvement on operability in the image correction process and shortening of a process time.

BRIEF DESCRIPTION OF THE DRAWINGS

These objects and other objects and advantages of the present invention will become more apparent upon reading of the following detailed description and the accompanying drawings in which:

FIG. 1B is a rear view illustrating the cellular phone according to the embodiment of the invention;

DETAILED DESCRIPTION OF THE PREFERRED EMBODIMENTS

Cellular phones 1 according to embodiments of the invention will be elaborated with reference to accompanying drawings.

First Embodiment

First, the structure of the cellular phone 1 of a first embodiment of the invention will be explained.

Figure 1A:
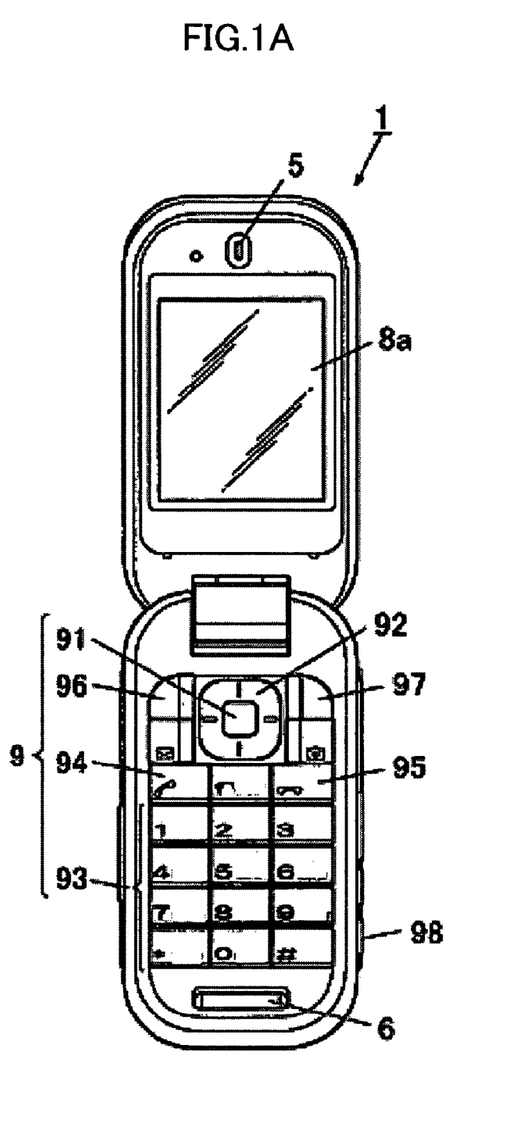
FIG. 1A is a front view illustrating a cellular phone according to an embodiment of the invention.

As illustrated in FIGS. 1A and 1B, the cellular phone 1 has a main body separated into two parts, and is structured in a foldable manner by a coupling mechanism provided at the central portion of the main body.

As illustrated in FIG. 1A, provided on the front face of the cellular phone 1 open are a main display screen 8a and a key input unit 9. The main display screen 8a displays, for example, an operation screen mainly used when a user operates the cellular phone 1, and images acquired by the cellular phone 1.

The key input unit 9 includes various function keys, such as a Set key 91 for setting operation, a cursor key 92 for a cursor operation, ten keys 93 for inputting numbers, characters, and the like, an Off-hook key (talk start button) 94 for instructing initiation of talking, an On-hook key (talk termination button) 95 for instructing termination of talking, a camera key 96 for starting up a camera mode, and a menu key 97 for a menu operation. The key input unit 9 further includes an image pickup key 98, provided on the side face of the cellular phone 1, for image pickup operation.

A receiver speaker 5 is provided above the main display screen 8a. A transmitter microphone 6 is provided below the key input unit 9.

As illustrated in FIG. 1B, the rear face of the cellular phone 1 is provided with a sub display screen 8b and an image pickup lens 10a of an image pickup unit 10. The sub display screen 8b is used auxiliarily when the cellular phone 1 is folded.

Figure 2:
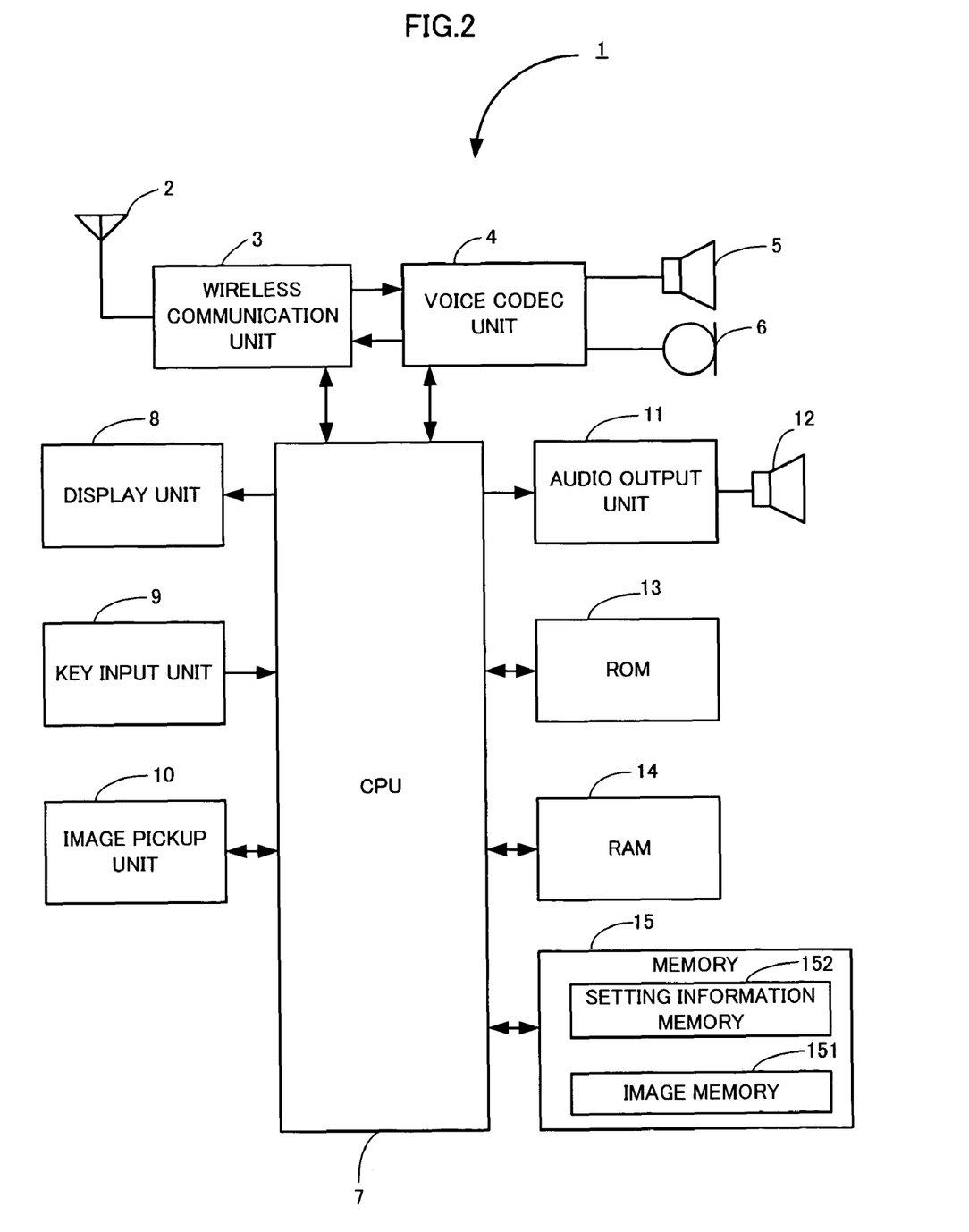
FIG. 2 is a block diagram illustrating the structure of the cellular phone illustrated in FIGS. 1A and 1B.

As illustrated in FIG. 2, the cellular phone 1 has an antenna 2, a wireless communication unit 3, a voice codec unit 4, the receiver speaker 5, the transmitter microphone 6, a CPU (Central Processing Unit) 7, a display unit 8, the key input unit 9, the image pickup unit 10, an audio output unit 11, a speaker 12, a ROM (Read Only Memory) 13, a RAM (Random Access Memory) 14, a memory 15, and the like.

The wireless communication unit 3 demodulates a wireless communication signal received from a wireless base station (not illustrated) through the antenna 2, and acquires communication control data, voice data, communication data, etc., from a demodulated baseband signal (digital signal).

The wireless communication unit 3 supplies the acquired voice data to the voice codec unit 4. The voice codec unit 4 converts the supplied voice data into an analog voice signal, and outputs the voice signal to the receiver speaker 5.

The wireless communication unit 3 supplies the acquired communication data to the CPU 7. The CPU 7 stores the supplied communication data in the RAM 14.

The wireless communication unit 3 is supplied with voice data coded by a predetermined algorithm from the voice codec unit 4. The wireless communication unit 3 adds the communication control data to the supplied voice data to generate a baseband signal, modulates a carrier using the baseband signal, and transmits the modulated signal to the wireless base station (not illustrated) through the antenna 2.

The voice codec unit 4 decodes the voice data supplied from the wireless communication unit 3 (expansion process), converts the data into an analog voice signal, and supplies the voice signal to the receiver speaker 5. The voice codec unit 4 codes an analog voice signal supplied from the transmitter microphone 6 (compression process), converts this signal into voice data, and supplies the voice data to the wireless communication unit 3.

The CPU 7 reads out a designated program in various programs stored in the ROM 13, expands the program in the work area of the RAM 14, and runs the program. For example, the CPU 7 controls the image pickup unit 10 to be discussed later according to a predetermined program stored in the ROM 13, and performs image correction on an acquired picked-up image.

The display unit 8 has the main display screen 8a illustrated in FIG. 1A, and the sub display screen 8b illustrated in FIG. 1B, and displays display data obtained by execution of the various programs under the control of the CPU 7.

The key input unit 9 has the various keys, such as the Set key 91, the cursor key 92, ten keys 93, the Off-hook key 94, the On-hook key 95, the camera key 96 for starting up the camera mode, the menu key 97 for the menu operation, and the like, all illustrated in FIG. 1A. In addition, the key input unit 9 has the image pickup key 98, provided on the side face of the cellular phone 1, for an image pickup operation. The key input unit 9 supplies an operation signal according to the user's key operation to the CPU 7.

The image pickup unit 10 has the image pickup lens 10a illustrated in FIG. 1B, photoelectric conversion elements, such as a CCD (Charge Coupled Device), and a CMOS (Complementary Metal-Oxide Semiconductor), and an A/D (Analog-to-Digital) converter, and the like. The image pickup unit 10 converts an optical image acquired by the image pickup lens 10a into an image signal by the photoelectric conversion elements, and converts the image signal to digital image data by the A/D converter, yielding picked-up image data.

The audio output unit 11 outputs an audio signal to the speaker 12 in response to an audio instruction from the CPU 7 when the cellular phone 1 gets an incoming call or the like, and informs the user of the incoming call or reception of a mail by an audio sound.

The ROM 13 stores the various programs to be run by the CPU 7, parameters, data, and the like necessary for running the programs. For example, the ROM 13 stores programs for executing an image pickup process and an image correction process to be discussed later with reference to FIGS. 4 and 8.

The RAM 14 forms a work area that temporarily stores the various programs to be run by the CPU 7 and data on the programs.

The memory 15 comprises, for example, a nonvolatile semiconductor memory that can electrically erase and rewrite the contents thereof, and stores various information written by the CPU 7. The memory 15 has an image memory 151, and stores image data picked up by the image pickup unit 10 and image data received by the wireless communication unit 3 in the image memory 151. The memory 15 also has a setting information memory 152, and stores setting information for controlling the operation of the cellular phone 1 in the setting information memory 152.

The setting information includes information for setting the operation mode of the cellular phone 1, information for specifying a process to be performed on a picked-up image (image process), information for controlling the operation of the cellular phone 1 in communication, and the like.

Figure 3A:
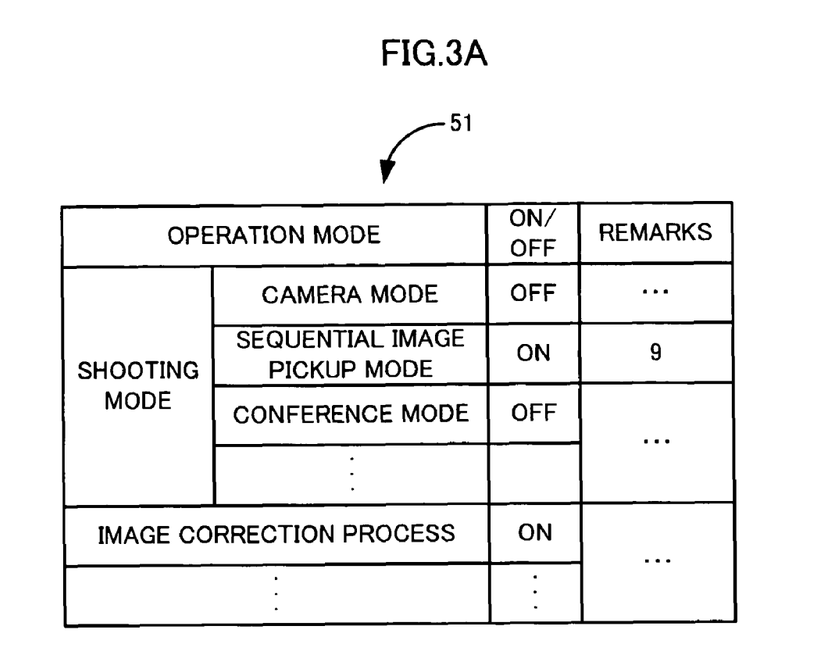
FIG. 3A is a diagram illustrating a table which is stored in a setting information storing area and illustrating setting information on the operation of the cellular phone.

For example, the setting information comprises pieces of information indicating the operation mode of the cellular phone 1 and whether or not the operation mode is set. FIG. 3A illustrates the specific example of the setting information. Setting information 51 includes ON/OFF information indicating which one of three shooting modes of a "camera mode", a "sequential image pickup mode", and a "conference mode" that the cellular phone 1 has is set. For the sequential image pickup mode, the number of images acquired at one shooting is set. In the example of the setting information 51, the "ON/OFF" field of the "sequential image pickup mode" represents "ON", so that the "sequential image pickup mode" for sequential image pickup is set. In the "remarks" field of the "sequential image pickup mode" represents "9", and it is so set as to sequentially shoot nine times when the image pickup unit 10 picks up an image of an object in the sequential image pickup mode. Further, the field of an "image correction process" column represents "ON", and a picked-up image is set to undergo the image correction process. The setting information 51 can be changed and edited by giving an instruction to the CPU 7 in response to the user's operation of the menu key 97, the cursor key 92, the Set key 91, or the like of the key input unit 9.

Next, an explanation will be given of the operations of the cellular phone 1 having the foregoing structure.

The basic operations of the cellular phone 1, i.e., a communication operation, an image pickup operation and the like, are the same as those of normal cellular phones.

Hereinafter, a characteristic operation in sequential image pickup mode will be explained.

First, the outline of the operation of the cellular phone 1 in sequential image pickup mode will be explained with reference to FIG. 3B.

When shooting is carried out in the sequential image pickup mode, the user operates the key input unit 9 to set the sequential image pickup mode and the image correction process in the setting information ON, and then operates the image pickup key 98.

In response to the operation of the image pickup key 98, the image pickup unit 10 acquires plural pieces of picked-up image data 21. The CPU 7 stores the acquired plural pieces of picked-up image data 21 in a picked-up image storing area 20 provided in the RAM 14 or the image memory 151.

The CPU 7 calculates correction data 41 to be used in image correction for a piece of picked-up image data 21 in the plural pieces of stored picked-up image data 21, and stores the correction data 41 in a correction data storing area 40 provided in the RAM 14.

Subsequently, the CPU 7 performs an image correction process for correcting the distortion of an object image on each piece of remaining picked-up image data 21, using the correction data 41, thus generating processed image data 31. The cellular phone 1 stores the generated processed image data 31 in a processed image storing area 30 provided in the image memory 151.

Figure 4:
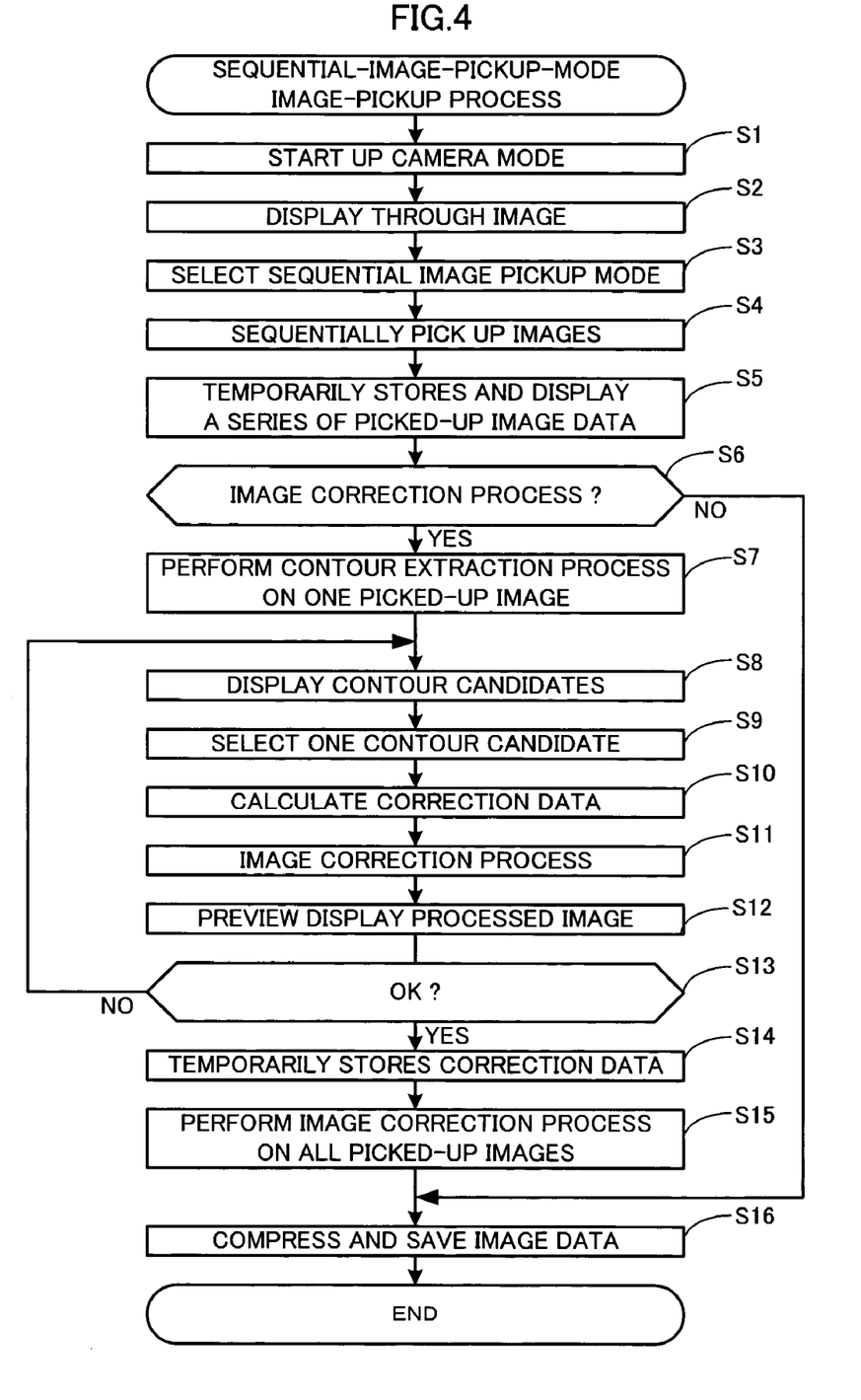
FIG. 4 is a flowchart illustrating the flow of a sequential mode image pickup process

Next, a sequential-mode image pickup process of the cellular phone 1 will be explained with reference to FIG. 4. The sequential-mode image pickup process is executed as the CPU 7 runs a sequential-mode image pickup process program stored in the ROM 13.

With the cellular phone 1 in an incoming call standby mode, when detecting operation of the camera key 96, the CPU 7 loads a program for image pickup stored in the ROM 13 into the RAM 14, runs the program, and starts up the camera mode (step S1). The CPU 7 causes the image pickup unit 10 to start acquiring images, and causes the main display screen 8a to display the acquired images (hereinafter, "through image") (step S2).

To facilitate understanding, it is supposed that the user operates the key input unit 9 to instruct shifting of the operation mode to the sequential image pickup mode, and operates the image pickup key 98. Then, the CPU 7 detects the operation of those keys, sets the operation mode to the sequential image pickup mode (step S3), and controls the image pickup unit 10 to cause the image pickup unit 10 to sequentially shoot the same object a predetermined number of times set in the setting information 51 (nine times in the embodiment) (step S4).

The CPU 7 stores a series of picked-up image data 21 acquired by the sequential image pickup of the image pickup unit 10 in the picked-up image storing area 20. The CPU 7 creates thumbnail images 81a of the series of picked-up image data 21. The CPU 7 lays out the created thumbnail images 81a as buttons, forming a sequential shooting image 81 illustrated in FIG. 5. The CPU 7 displays the formed sequential shooting image 81 on the main display screen 8a (step S5).

Figure 5:
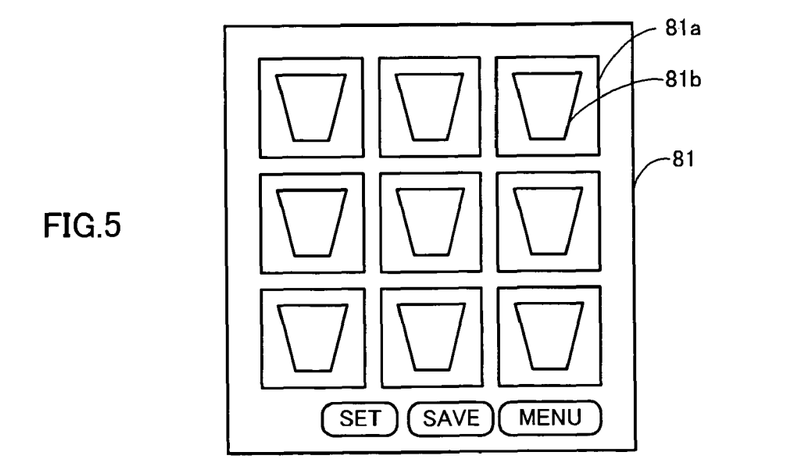
FIG. 5 is a diagram illustrating an example of a sequentially-shot-image display screen.

FIG. 5 illustrates the sequential shooting image 81 obtained when a rectangular object, such as a whiteboard or a document, is sequentially shot. In FIG. 5, the object is not shot from the front, so that an object 81b in the thumbnail image 81a is distorted in a trapezoidal shape. In general, the same object is sequentially shot plural times at approximately the same shooting angle at the same image pickup position in sequential image pickup. Accordingly, the images of the object 81b in the thumbnail images 81a of the plural picked-up images obtained by sequential image pickup become distorted images similar to one another.

After the sequential shooting image 81 is displayed, the CPU 7 refers to the setting information 51 illustrated in FIG. 3A, and determines whether or not to set execution of the image correction process (step S6).

When having determined that execution of the image correction is not set (step S6: NO), the CPU 7 compresses the series of picked-up image data 21, stores the picked-up image data 21 in the image memory 151 (step S16), and terminates the process.

When having determined that execution of the image correction is set (step S6: YES), the CPU 7 extracts the contour of the object for a piece of picked-up image data (reference image), selected by the user, in the series of picked-up image data 21 (step S7). To determine the reference image, the user operates, for example, the cursor key to select an arbitrary thumbnail image (button) 81a. The CPU 7 discriminates plural straight lines which match with a template for discriminating straight lines with respect to the picked-up image data 21 corresponding to the selected thumbnail image 81a. The CPU 7 detects straight lines so coupled together as to form a closed quadrangle from the discriminated straight lines, and extracts the contour of the closed quadrangle. Alternatively, the CPU 7 may discriminate plural straight lines using a filter which filters out nonlinear lines, detect ones so coupled together as to form a closed quadrangle in the discriminated straight lines, and extract the contour of the closed quadrangle.

When there is a plurality of closed contours of the quadrangles, the CPU 7 extracts the plurality of contours. The CPU 7 displays the extracted contours (contour candidates) on the main display screen 8a as a contour candidate display screen 82 illustrated in FIG. 6 together with the selected picked-up image data 21 (step S8).

Figure 6:
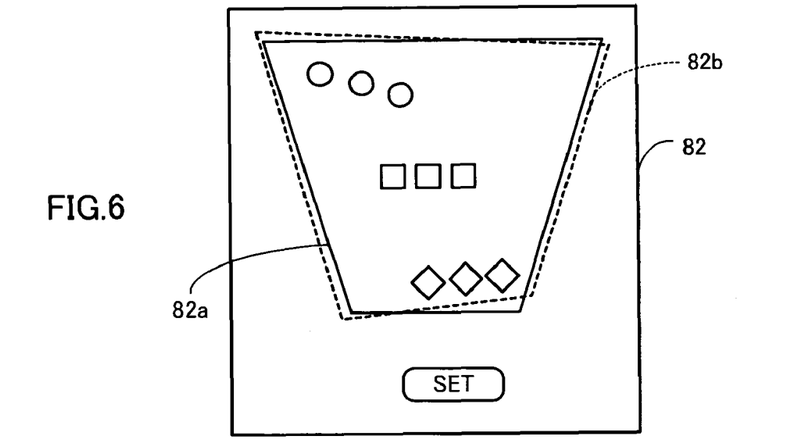
FIG. 6 is a diagram illustrating an example of a contour candidate display screen.

In the contour candidate display screen 82 illustrated in FIG. 6, two contour candidates of a contour candidate 82a represented by solid lines and a contour candidate 82b represented by dotted lines are extracted. The CPU 7 detects selection of any one contour candidate corresponding to the object in the contour candidates by the cursor operation through the cursor key 92, and setting through the Set key 91 following the selection of the contour candidate (step S9).

With the selected contour (contour candidate) taken as a reference for image correction (hereinafter, correction reference), the CPU 7 calculates correction data 41 for correcting the correction reference contour to an approximate rectangular by coordinate transformation (step S10).

To facilitate understanding, it is supposed that the image correction is performed based an equation 1. It is supposed that the coordinates of each pixel in an original picture (picked-up image) are taken as P(x, y), and the coordinates of each pixel in a processed image after the image correction are taken as Q(x, y) in the equation 1.

$$Q(x,y)=P(ax+b, cy+d)$$ Equation 1

To perform the image correction using the equation 1, it is necessary to acquire constants a to d.

The CPU 7 substitutes the coordinates P'(x, y) of each vertex of the correction reference contour and the coordinates Q'(x, y) of each vertex in an approximate rectangle after the image correction into the equation 1, acquiring the constants a to d as correction data 41.

The CPU 7 sets the calculated correction data (a to d) 41 in the equation 1, performs coordinate transformation on each pixel of the picked-up image data, thereby performing the image correction process which corrects the distortion of the object image included in the picked-up image (step S11).

Note that the coordinate transformation may be performed by the projective transformation disclosed in Unexamined Japanese Patent Application KOKAI Publication No. 2005-115711. The contents of this publication will be incorporated in the present application. In this case, correction data (transformation parameter) 41 is acquired based on one picked-up image, and the correction data 41 is applied to all images, thereby performing coordinate transformation.

Figure 7:
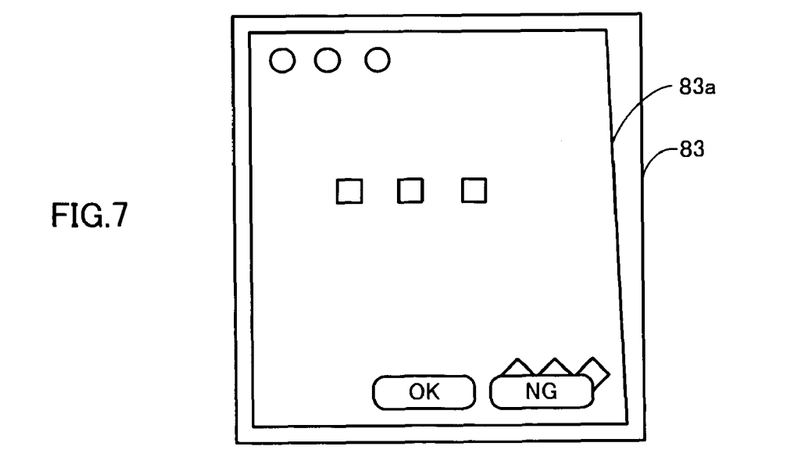
FIG. 7 is a diagram illustrating an example of a preview screen.

The CPU 7 displays a preview image 83, which displays a processed image 83a after the image correction process illustrated in FIG. 7 as a preview, on the main display screen 8a (step S12).

The user checks the image after the correction, presses down an OK key if the corrected image is fine, or presses down an NG (No Good) key if the image is not acceptable.

When the CPU 7 detects a key operation corresponding to "NG", i.e., an operation of the menu key 97 (step S13: NO), the process returns to the step S8. The image correction process based on another selected contour candidate, and preview display after the image correction process are performed.

When having detected a key operation corresponding to "OK" (step S13: YES), the CPU 7 stores the correction data 41 in the correction data storing area 40 (step S14).

Subsequently, the CPU 7 sets the correction data 41 in the equation 1, sequentially selects plural pieces of remaining picked-up image data 21 stored in the picked-up image storing area 20, applies the coordinates of each pixel of the selected picked-up image data 21 to the equation 1, performs coordinate transformation, creating processed image data 31.

The CPU 7 repeats the same image correction process using the same correction data 41 until the correction process for the plurality of sequentially picked-up image data 21 stored in the picked-up image storing area 20 is completed (step S15).

The CPU 7 compressed the processed image data 31 undergone the image correction process, stores the compressed data in the processed image storing area 30 (step S16), and terminates the process.

As explained above, the cellular phone 1 calculates the correction data 41 to be used in image correction based on one picked-up image in the plural picked-up images obtained in the sequential image pickup mode. The cellular phone 1 performs the image correction process on each of the picked-up images sequentially picked up, using the calculated correction data 41. Accordingly, the operation for executing the image correction process and the calculation of the correction data for each image become unnecessary. This improves the operability in the image correction process and shortens the process time.

Second Embodiment

Next, an explanation will be given of the second embodiment of the invention.

In the first embodiment, the explanation has been given of a case where the same image correction process is performed on a plurality of images picked up in the sequential image pickup mode. An explanation of the second embodiment will be given of a case where the image correction process is performed on a series of images picked up at approximately the same shooting angle within a specified shooting period, e.g., a case where, for example, a user shoots a whiteboard or an image from a projector while sitting down on the same seat in a conference room during a conference.

Figure 3B:
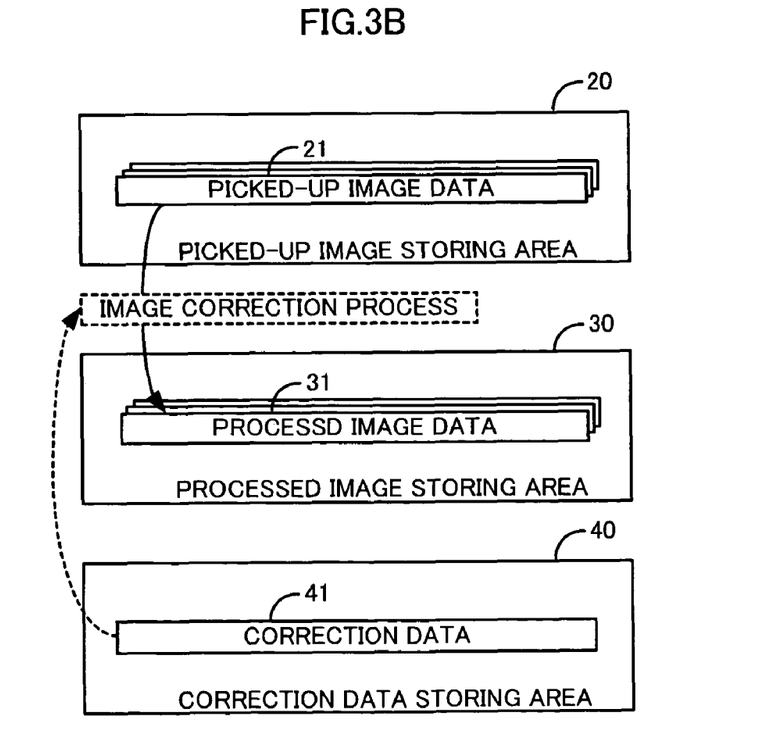
FIG. 3B is a diagram illustrating storing areas for various data of the cellular phone according to the embodiment of the invention, and flows of the data.

Because the structure of the cellular phone 1 of the second embodiment is the same as that illustrated in FIGS. 1A, 1B, and 2, and storing areas for various data and the setting information on the cellular phone 1 are the same as those illustrated in FIGS. 3A, 3B, the redundant explanations thereof will be omitted.

When a whiteboard or an image from the projector is shot at approximately the same shooting angle within a specified image pickup period, the user selects the "conference mode" illustrated in FIG. 3A, and executes image pickup.

Figure 8:
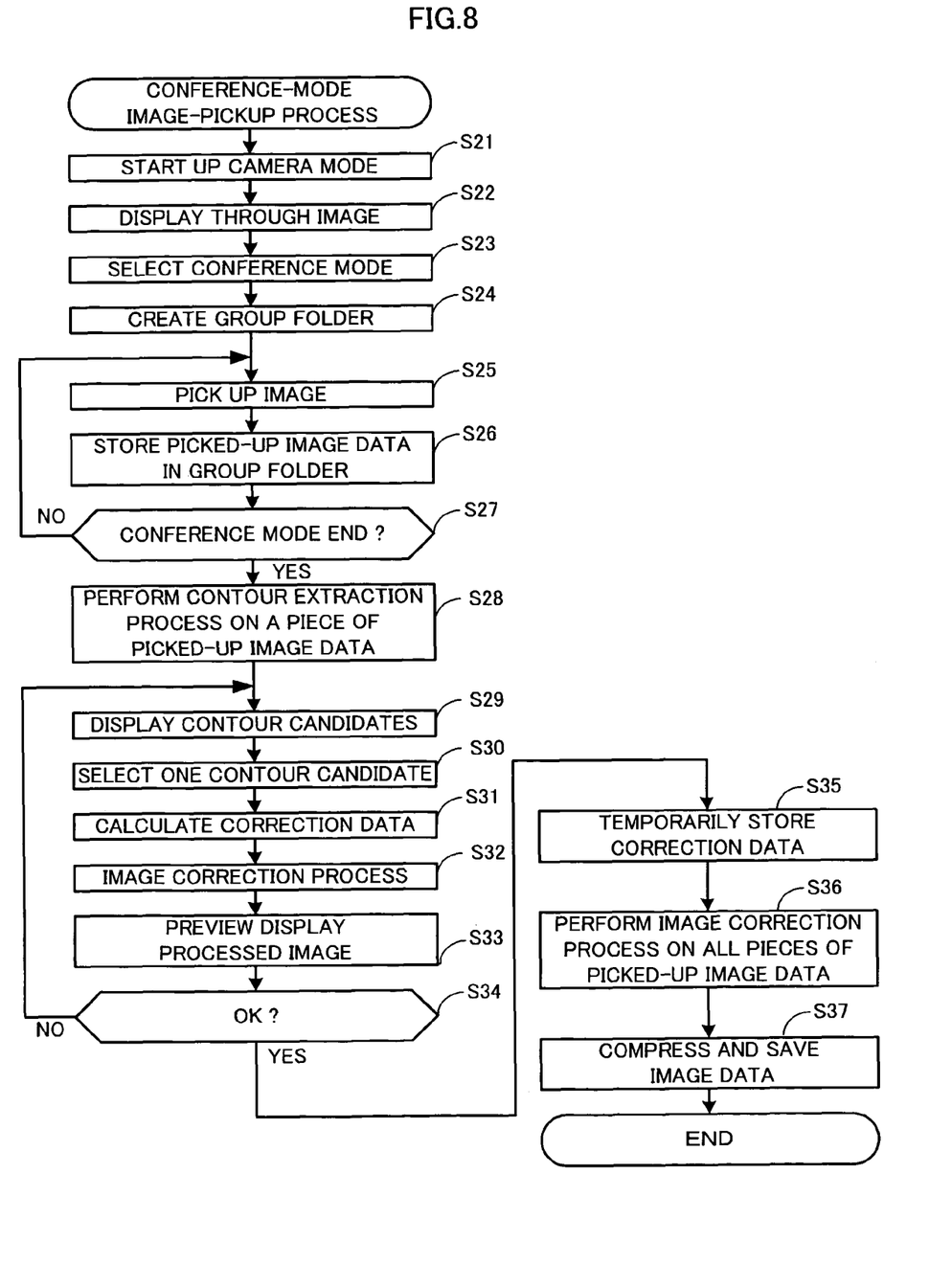
FIG. 8 is a flowchart illustrating the flow of a conference-mode-image-pickup process.

A conference-mode-image-pickup process of the cellular phone 1 according to the second embodiment will be explained with reference to FIG. 8. The conference-mode-image-pickup-process is executed when the CPU 7 runs a conference-mode-image-pickup-process program stored in the ROM 13.

With the cellular phone 1 in an incoming call waiting mode, when detecting the operation of the camera key 96, the CPU 7 loads the program for image pickup stored in the ROM 13 in the RAM 14, starting up the camera mode (step S21). The CPU 7 causes the image pickup unit 10 to start acquisition of images, and displays the acquired through image on the main display screen 8*a* (step S22). It is supposed that the user performs a key operation of the menu key 97 and key operations of the cursor key 92 and the Set key 91 following the operation of the menu key 97 to instruct shifting of a mode to the conference mode, and the CPU 7 detects those key operations (step S23). The CPU 7 then create a group folder for storing picked-up image data 21 to be obtained by a series of image pickup in the conference mode in the image memory 151 (step S24).

When detecting operation of the image pickup key 98, the CPU 7 causes the image pickup unit 10 to perform image pickup (step S25). The CPU 7 compresses the image data of a picked-up image obtained by image pickup, and stores the compressed data in the group folder (picked-up image storing area 20) created in the step S24 (step S26). The CPU 7 repeats the processes in the steps S25 and S26 until key operation to terminate the conference mode is detected, and stores picked-up image data 21 obtained by the image pickup in the group folder.

When the key operation of instructing the termination of the conference mode is detected (step S27: YES), the CPU 7 performs a contour extraction process of extracting the contour of the object included in a picked-up image for one of the series of picked-up image data 21 (in this embodiment, the first picked-up image data) stored in the group folder created in the step S24 (step S28). When there are plural closed contours of quadrangles, the plural contours are extracted. The extracted contour (contour candidate) is displayed on the main display screen 8*a* as a contour candidate display image 82 illustrated in FIG. 6 together with the picked-up image (step S29).

It is supposed that the user selects any one of the contour candidates corresponding to the object through cursor operation of the cursor key 92 in the contour candidate display screen 82, performs setting operation through the Set key 91, and the CPU 7 detects those key operations (step S30). The CPU 7 takes the selected contour candidate as a correction reference, and calculates correction data 41 for correcting the contour region of the correction reference to an approximate rectangle by coordinate transformation (step S31). The CPU 7 performs coordinate transformation on each pixel of the picked-up image, using the calculated correction data 41, thereby performing the image correction process of correcting the distortion of the object image included in the picked-up image (step S32).

After image correction with the contour candidate taken as the correction reference is performed, the CPU 7 displays a processed image 83*a* undergone the image correction on the main display screen 8*a* as a preview image 83 (see, FIG. 7) (step S33). When a key corresponding to "NG" in the preview image 83 illustrated in FIG. 7 is operated, i.e., when operation of the menu key 97 is detected (step S34: NO), the process returns to the step S29, and the image correction process based on another selected contour candidate and displaying of a preview after the image correction process are performed. When a key corresponding to "OK" in the preview image 83 is operated, i.e., when operation of the Set key 91 is detected (step S34: YES), the CPU 7 temporarily stores contour data of the contour candidate selected in the step S30 (e.g., coordinate position information on four corners) and correction data 41 calculated based on the contour data in the correction data storing area 40 in the RAM 14 (step S35). The CPU 7 performs the image correction process on all pieces of picked-up image data 21 saved in the group folder created in the step S24, using the correction data 41 stored in the step S35 (step S36). The CPU 7 compresses processed image data 31 undergone the image correction process, stores the compressed data in the processed image storing area 30 in the image memory 151 (step S37), and terminates the process.

As explained above, the cellular phone 1 calculates the correction data 41 to be used in correcting an image based on a piece of picked-up image data 21 in the plural pieces of picked-up image data 21 picked up during the operation in the conference mode. The cellular phone 1 performs the image correction process on all pieces of the picked-up image data 21 picked up during the operation in the conference mode, using the calculated correction data 41. Accordingly, operation for executing the image correction process and calculation of the correction data 41 for each image becomes unnecessary when image correction is performed on a series of picked-up image obtained by image pickup the same object like the whiteboard or the image from the projector at approximately the same shooting angle. This improves the operability when image correction is performed on an image picked up in a conference or the like, and shortens the process time.

The foregoing embodiments are just examples, and the invention is not limited to the foregoing embodiments.

For example, the image correction process is executed with one of the extracted contour candidates taken as the correction reference, and a correction result is displayed as a preview in the first and second embodiments. However, the image correction process may be executed with all extracted contour candidates taken as correction references, and the process results may be displayed as previews one by one according to operation of the cursor by the user.

The invention is applied to a case where the image correction process is performed on still images sequentially picked up in the first and second embodiments, but the invention is not limited to this case, and may be applied to a case where the image correction process is performed on a series of frame images obtained by picking up motion pictures.

The conference mode in the second embodiment can be used not only for a case of image pickup in a conference, but also for a case of shooting the same rectangular object, for example, a case of shooting a chalk board in class.

Although one image selected by the user in the plural picked-up images is used as the reference image for the image correction in the embodiments of the invention, a preset image (for example, a first image) may be used as a reference image. Although the user selects a contour candidate from the plural contour candidates, and uses the selected contour candidate as the reference for the image correction process, the four corners of a quadrangle to be a correction reference may be selected, and a contour which connects the selected four corners together may be the reference for the image correction process.

The cellular phone 1 performs image correction on the plural picked-up images picked up in the sequential image pickup mode or in the conference mode in the embodiments of the invention. The present invention is, however, not limited to those cases. For example, the same image correction process may be performed on images picked up sequentially, intermittently, or within a predetermined period in an arbitrary shooting mode. The invention is not limited to the example of performing image correction right after image pickup, and image correction may be performed on plural images stored beforehand or obtained externally. Moreover, image correction may be performed on plural images selected by the user. In this case, for example, the user selects one of the plural images, acquires correction data based on the selected image, and the same image correction is performed on the plural images using the acquired correction data.

In addition, the details of the structure and operation of the cellular phone 1 can be changed and modified in various forms without departing from the spirit and scope of the invention.

A case where the invention is applied to the cellular phone has been explained as an example, but the invention can be applied to, for example, a digital camera (still camera, video camera), a PDA (Personal Digital Assistance) with an image pickup function, or a computer with an image pickup function.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-356394 filed on Dec. 9, 2005, and including specification, claims, drawings and summary. The disclosure of the above Japanese Patent Application is incorporated herein by reference in its entirety.

What is claimed is:

1. An image pickup device comprising:
   an image pickup unit that converts an image including an object into an electrical signal to acquire a picked-up image;
   a mode selection unit that selects a particular image pickup mode in which an image pickup is performed a plurality of times in one circumstance by the image pickup unit;
   a temporary memory unit that temporarily stores a plurality of picked-up images shot in the particular image pickup mode when a plurality of images are picked up by an arbitrary image pickup instruction operation in a condition in which the particular image pickup mode is selected by the mode selection unit;
   a correction unit that performs a first process of, after finishing the shooting of the plurality of images in the particular image pickup mode, for any one of the picked-up images designated from the plurality of picked-up images temporarily stored in the temporary memory unit, performing image extraction of the designated one of the picked-up images to execute an image correction process on the image content of the designated one of the picked-up images and a second process of retaining correction data of the picked-up image corrected in the first process, and correcting, in the same image correction process performed on the designated one of the picked-up images, another picked-up image of an area specified by the particular image pickup mode temporarily stored in the temporary memory unit, based on the retained correction data; and
   an image storage unit that stores each of the picked-up images corrected in the first process and the second process as picked-up images corrected at the time of shooting.

2. The image pickup device according to claim 1, wherein the particular image pickup mode is a sequential image pickup mode which sequentially shoots the plurality of images by the image pickup unit.

3. The image pickup device according to claim 1, wherein the particular image pickup mode is a mode storing a plurality of images picked up as a series of images acquired by shooting by the image pickup unit within a designated image pickup period, from an operation of designating a beginning of an area to an operation of designating an end of the area by a user.

4. The image pickup device according to claim 3, wherein the plurality of picked-up images which are designated by the user operation are stored in a specific image memory area included in the temporary memory unit.

5. The image pickup device according to claim 1, further comprising a display unit that displays the plurality of picked-up images acquired by the image pickup unit and an image corrected by the first correction unit.

6. The image pickup device according to claim 1, wherein, in the first process, the correction unit recognizes a plurality of straight lines matching with a template from the designated one of the picked-up images, detects straight lines so connected together as to form a quadrangle in the recognized straight lines, and extracts the quadrangle formed by the detected straight lines as a contour of the object.

7. The image pickup device according to claim 1, wherein, in the first process, the correction unit filters out lines which are not straight lines from the designated one of the picked-up images to recognize a plurality of straight lines, detects the recognized straight lines which are so connected together as to form a quadrangle, and extracts the quadrangle formed by the detected straight lines as a contour of the object.

8. The image pickup device according to claim 1, wherein the correction unit, in the first process, extracts a contour region of the object of the designated one of the picked-up images, and performs linear transformation on the extracted contour region to correct the contour region to an approximate rectangle, and
   the correction unit, in the second process, corrects the another picked-up image, based on correction data derived when the contour region was corrected to the approximate rectangle for the designated one of the picked-up images in the first process.

9. The image pickup device according to claim 1, wherein the correction unit, in the first process, extracts a contour region of the object of the designated one of the picked-up images, and performs projective transformation on the extracted contour region to correct the contour region to an approximate rectangle, and
   the correction unit, in the second process, corrects the another picked-up image, based on correction data derived when the contour region was corrected to the approximate rectangle for the designated one of the picked-up images in the first process.

10. The image pickup device according to claim 1, wherein in the first process, the image correction process by the correction unit, after finishing the shooting of the plurality of images in the particular image pickup mode, when the image correction process is designated to execute by a user, is executed, and the correction unit, after finishing the shooting of the plurality of images in the particular image pickup mode, when the image correction process is not designated to execute by a user, stores each picked-up image which is temporarily stored in the temporary memory unit without image correction.

11. A picked-up image processing method comprising:

an image pickup step of picking up an object;

a mode selection step of selecting a particular image pickup mode in which an image pickup is performed a plurality of times in one circumstance in the image pickup step;

a temporary memory step of temporarily storing a plurality of picked-up images shot in the particular image pickup mode on a recording medium when a plurality of images are picked up by an arbitrary image pickup instruction operation in a condition in which the particular image pickup mode is selected in the mode selection step;

a first correction step of performing, after finishing the shooting of the plurality of images in the particular image pickup mode, for any one of the picked-up images designated from the plurality of picked-up images temporarily stored in the temporary memory step, image extraction of the designated one of the picked-up images to execute an image correction process on the image content of the designated one of the picked-up images;

a second correction step of retaining correction data of the picked-up image corrected by the first correction step, and correcting, in the same image correcting process performed on the designated one of the picked-up images, another picked-up image of an area specified by the particular image pickup mode temporarily stored in the temporary memory step, based on the retained correction data; and an image storage step of storing each of the picked-up images corrected by the first correction step and the second correction step as picked-up images corrected at the time of shooting.

12. A non-transitory computer-readable recording medium storing a program that allows a computer for controlling an image pickup device having an image pickup unit which converts an optical image including an object into an electrical signal to acquire a picked-up image to realize:

a mode selection function of selecting a particular image pickup mode in which an image pickup is performed a plurality of times in one circumstance in the image pickup unit;

a temporary memory function of temporarily storing a plurality of picked-up images shot in the particular image pickup mode on a recording medium when a plurality of images are picked up by an arbitrary image pickup instruction operation in a condition in which the particular image pickup mode is selected in the mode selection function;

a first correction function of performing, after finishing the shooting of the plurality of images in the particular image pickup mode, for any one of the picked-up images designated from the plurality of picked-up images temporarily stored in the temporary memory function, image extraction of the designated one of the picked-up images to execute an image correction process on the image content of the designated one of the picked-up images;

a second correction function of retaining correction data of the picked-up image corrected by the first correction function, and correcting, in the same image correction process performed on the designated one of the picked-up images, another picked-up image of an area specified by the particular image pickup mode temporarily stored in the temporary memory function, based on the retained correction data; and an image storage function of storing each of the picked-up images corrected by the first correction function and the second correction function as picked-up images corrected at the time of shooting.

* * * * *